Sept. 3, 1940.   W. C. MONAHAN   2,213,715
BUTTON OR ANALOGOUS FASTENING DEVICE
Filed Dec. 19, 1939   2 Sheets-Sheet 2
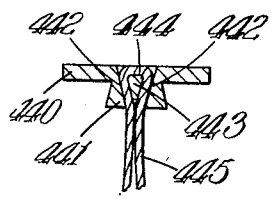
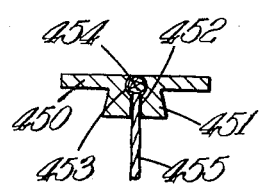
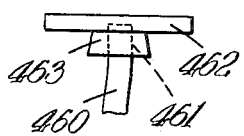
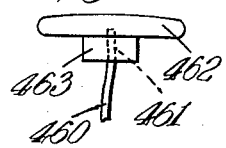
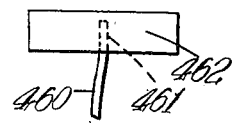
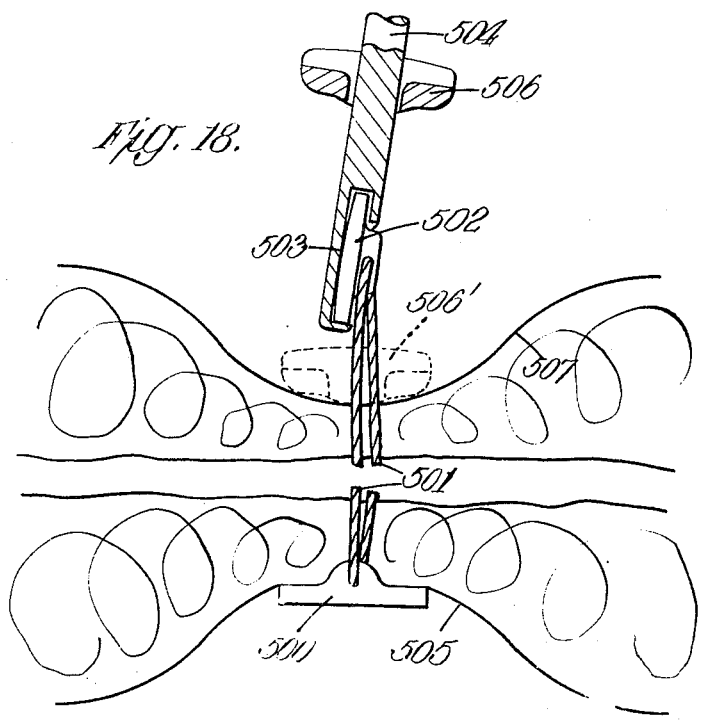
INVENTOR
WILLIAM COSTELLO MONAHAN
BY Hornidy and Dowd
ATTORNEYS

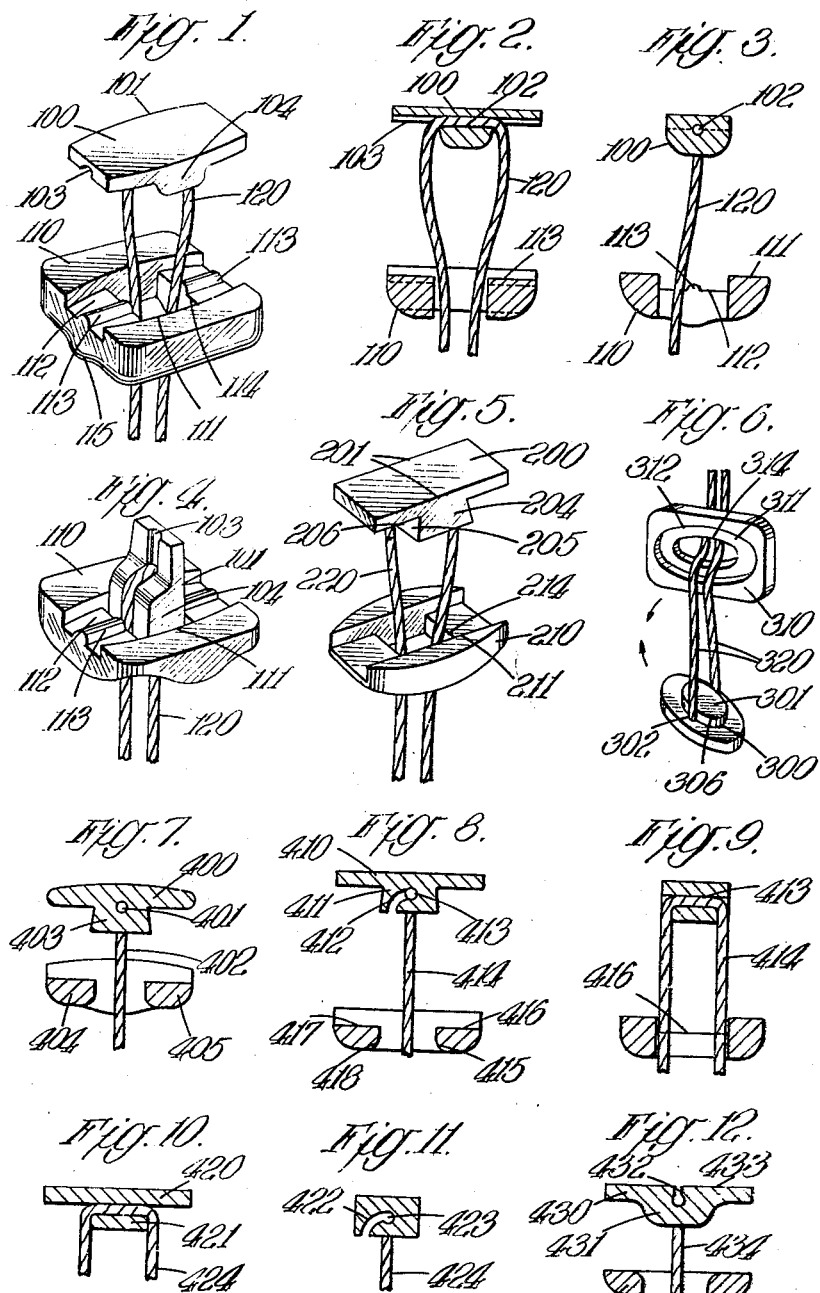

Patented Sept. 3, 1940

2,213,715

UNITED STATES PATENT OFFICE

2,213,715

BUTTON OR ANALOGOUS FASTENING DEVICE

William Costello Monahan, London, England

Application December 19, 1939, Serial No. 309,933
In Great Britain December 20, 1938

6 Claims. (Cl. 24—102)

The present invention relates to buttons, studs, and analogous fastening devices and is especially applicable to tufts used in upholstery, mattresses and the like, but is also capable of wider application, for example to buttons for clothing.

An object of this invention is to provide a fastening device which may readily be secured or released, when desired, and which does not tend to become released accidentally or to damage articles to which it is applied.

The fastening device of the present invention comprises a flexible element provided with a head at one or at each end and a member having an aperture of insufficient size to permit passage of such a head when in a normal position but which is adapted to allow the head to pass therethrough when disposed abnormally. Withdrawal of the head after engagement is prevented by its return to a normal position transversely of the aperture.

The procedure for engaging a fastening device in accordance with this invention is to pass a head at one end of the flexible element while in an abnormal disposition through a hole in one of the articles or parts to be secured together and also through the aperture in the apertured member. When longitudinal tension is applied to the flexible element the head assumes a (normal) position transversely of the aperture and withdrawal through the apertured member is thus prevented.

Advantageously the head and/or the apertured member according to this invention is or are provided with a resiliently engaging part or parts to prevent accidental disengagement of said head from said apertured member.

Preferably the head and the apertured member are so arranged that relative movement between them is substantially prevented. This may be achieved either by the use of cooperating resiliently engaging parts as above described or by shaping the head so that it fits in a recess or groove in the apertured member.

A feature of this invention consists in the method of applying the fastening device in accordance with this invention to the tufting of mattresses and other upholstery. In one such method a head at one end of the flexible element is carried by a needle through the mattress or the like, and, while the head is still engaged in the needle, the apertured member is passed over the needle and over the head of the tufting device to a position adjacent the surface of the mattress. When released from the needle the head of the tufting device assumes a normal position transversely of the aperture in the apertured member. It will be seen that to enable a fastening device to be used in this way the aperture in the apertured member must be sufficiently large to permit the passage of at least that part of the tufting needle which carries the head of the tufting device (disposed in an abnormal position) through the mattress.

The use of an apertured member in conjunction with the head of the tufting device which is drawn through the mattress increases the effective area of the head in contact with the surface of the mattress thereby decreasing any tendency of the head to pull through the ticking of the mattress. The use of the above method of engaging the head of the tufting device with the apertured member results in a considerable reduction in the time required for the tufting operation.

Various constructional embodiments of tufting devices in accordance with this invention are illustrated in the accompanying drawings, in which:

Figs. 1 to 4 show one form. Fig. 1 is a perspective view showing the head and the apertured member spaced apart. Figs. 2 and 3 are sectional views mutually at right angles along the length and across the width of the head respectively. Fig. 4 is a perspective view showing the way in which the head passes in an abnormal disposition through the apertured member.

Figs. 5 and 6 are perspective views showing alternative arrangements of head and apertured member.

Figs. 7 to 17 are sectional views showing various forms of head and apertured member. Figs. 9 and 11 are views at right angles to Figs. 8 and 10 respectively.

Fig. 18 shows diagrammatically a tufting operation in accordance with this invention.

Referring to the drawings, Figs. 1 to 4. A tufting device comprises a head 100, an apertured member 110 and a flexible element or strand of material 120. The head is provided with an apertured portion tiltably and slidably embracing the loop construction of the strand of material, whereby the head may at all times be forced to a position of equilibrium so far as the strand is concerned and thus avoiding unequalled distribution of stresses and strains on the strand of material. In this case the flexible element consists of a doubled loop of twine. The sides of the head 100 are slightly arcuate or barrel shaped, as indicated at 101, and when the head is engaged with the apertured member, the head 100 lies snugly in a recess 111 in the upper surface of the apertured member 110. A hole 102 extends through the head 100 in the direction of its length. The twine or strand 120 is passed through this hole to secure it to the head, the twine being freely movable through the hole. As indicated at 103, the hole 102 towards either end of the head becomes a slot open towards the under-side of the head. This facilitates moulding of the head and allows the thickness of the tufting element to be slightly reduced. The floor 112 of the recess 111 in the apertured member is provided with a raised part 113 which engages the slot 103 in the underside of the head. On its under surface the head 100 is provided with a projection 104 which lies in the aperture 114 in the apertured member. This projection 104 may if desired be a close fit in the aperture 114 (subject to a clearance for the twine 120) or it may lie loosely in the aperture as shown. In the construction shown in Figs. 1 to 4, this projection 104 is not a close fit in the aperture 114 but the relative positions of the slot 103 and apertured member 110 are maintained by the barrel shaped sides 101 of the head engaging the corresponding parts of the recess 111 in the apertured member. The lower surface of the apertured member is provided with a strengthening bulge 115 which extends in the direction of the length of the recess 111.

To engage the head in the apertured member the head is passed through the aperture 114 in an abnormal position, as illustrated in Fig. 4. It will be seen that the aperture 114 is of sufficient size to permit the passage through it in this position of the head 100 carrying with it the twine 120. When the head 100 has been passed right through the apertured member, it is turned from the abnormal position, shown in Fig. 4, to a normal position, as shown in Fig. 1, in which it may be drawn down to lie in the recess 111 in the upper surface of the apertured member.

If desired the walls of the recess 111 may be undercut slightly or otherwise arranged to engage resiliently or frictionally the upper part of the sides 101 of the head, the width of the head being slightly less at its upper surface than at its lower surface.

An alternative construction is illustrated in Fig. 5. In this case the sides 201 of the head 200 are parallel to each other while the recess 211 in the upper surface of the apertured member 210 is of similar shape. When the head and apertured member are assembled, they are of generally circular form which may be found desirable in certain classes of upholstery. The projection 204 below the head 200 is slightly wider at its lower end than adjacent the head, and is arranged to be a close fit in the aperture 214 of the apertured member, thereby preventing relative movement between these two parts of the tufting element. If desired, the projection 204 may be arranged to be a push fit in the aperture 214 to restrain the two parts against disengagement. A loop of twine 220 passes through a hole (not shown) in the under-side of the head 200. When tension is applied to the twine 220 it lies in generally vertical grooves 206 formed in the faces 205 of the projection 204 on the under-side of the head 200.

Fig. 6 illustrates a further alternative arrangement in which the head 300 is drawn into a recess 311 in the surface of an apertured member 310 and is surrounded on all sides by the walls of the recess. The head 300 is of oval shape and has a projection 301 with a hole 302 through which passes a loop of twine 320, the twine being arranged to lie in grooves 306 at the sides of the projection 301. It is desirable that the length of the head 300 should be considerably greater than its width as it is necessary for the greatest dimension of the aperture 314 in the apertured member to be greater than the width of the head. Similarly the thickness of the head must be less than the width of the aperture 314 and should be somewhat less than the width of the head. By suitable proportioning of the dimensions of the head and of the aperture in the apertured member, it is possible to obtain a suitable width of floor 312 of the recess 311 around the aperture 314.

Various alternative methods of attaching the flexible element to the head are illustrated in Figs. 7 to 17. In the arrangement illustrated in Fig. 7, the head 400 has a hole 401 which runs transversely of the head and through which is passed a doubled loop of twine 402. The head has a projection 403 on its under surface which, when the tufting element is assembled, engages as a push fit in the aperture 404 of the apertured member 405.

Figs. 8 and 9 show an alternative arrangement in which the head 410 has a projection 411 on its under surface which is provided with a curved slot 412 having an enlargement 413 at its inner end. The doubled loop of twine 414 is secured to the head by passing it along the slot 412 from its lower end until it lies in the enlargement 413.

An apertured member 415 has a recess 416 in its upper surface and an aperture 417 which is enlarged at its lower end at 418 as shown. The projection 411 is wider at its lower end than the aperture 417. The slot 412 and the resilience of the material allow this enlarged end of the projection to be compressed in passing through the aperture 417 and to increase in size on reaching the enlargement 418, thus securing the head to the apertured member.

In the construction shown in Figs. 10 and 11, the head 420 has on its under surface a projection 421 with a curved slot 422 having at its end an enlargement 423. The slot 422 extends in the direction of the length of the head 420 but in other respects is similar to the slot 412 of Figs. 8 and 9. The flexible element consists of a loop of twine 424. An apertured member (not shown) of suitable shape is provided.

A further alternative construction is shown in Fig. 12 in which the head 430, having a downward projection 431, is provided with a slot 432 extending from its upper surface 433. A loop of twine 434 is engaged in the slot 432, but when the tufting element is in position, the flexing of the head due to the upward pressure on its ends, which engage an apertured member 435, causes the upper end of the slot 432 to be reduced in width, thus preventing withdrawal of the twine from the slot.

In the arrangement illustrated in Fig. 13, the head 440, having a downward projection 441, has two holes 442 which extend through the thickness of the head and which have between them a rib 443. At the upper surface of the head the two holes 442 are joined by an open slot 444. A loop of twine 445 extends up through one of the holes 442 across the head 440 and down through the other hole 442.

Fig. 14 shows another arrangement in which a head 450, having a downward projection 451, has a hole 452 extending vertically through its thickness, and provided at its upper end with an enlargement 453 which is of sufficient size to house a knot 454 formed at the end of a single length of twine 455.

In the constructions illustrated in Figs. 15, 16 and 17, the flexible element consists of a piece of tape 460 which is secured by an adhesive in a recess 461 provided for this purpose and extending from the undersurface of the head 462. In the construction shown in Fig. 15, the width of the tape 460 runs in the direction of the length of the head which is provided with a downward projection 463. The arrangement of Fig. 16 is similar except that the width of the tape extends across the head. The form of head shown in Fig. 17 has no downward projection, as is shown in Figs. 15 and 16, but is increased in thickness to provide a sufficient depth of recess 461 to enable the tape 460 to be secured to it.

A method of tufting in accordance with this invention is illustrated diagrammatically in Fig. 18. A tufting device having a lower head 500 of any suitable form, for instance a round button, is connected by a flexible element 501 to an upper elongated head 502 which is shown as being of the type illustrated in Fig. 7 of the drawings. The head 502 is engaged in a recess 503 at the rear end of a tufting needle 504 either before the tufting needle has been engaged in the mattress or after the point of the needle has been passed through it. The needle is then drawn completely through the mattress so that the upper head 502 occupies a position generally as illustrated in Fig. 18 while the lower head 500 is drawn against the lower surface 505 of the mattress.

Alternatively a needle having a recess for the head of the tufting device adjacent its point may be used. In this case, the needle having the head engaged in the recess, is passed through the mattress and through the aperture in the apertured member. The head is then released from the needle which is drawn back through the mattress while the head assumes a position across the apertured member.

An apertured member 506 of suitable form for cooperating with the upper head 502 is then passed over the needle from its point end into a position 506', indicated in dotted lines, in which position the apertured member 506 engages the upper surface 507 of the mattress. The upper head 502 is then released from the recess 503 of the tufting needle 504 and is allowed to assume a normal position transversely of the apertured member 501. This tufting operation is facilitated if the mattress is held under compression while the tufting operation is performed. When the operation has been completed, the mattress is allowed to assume its full thickness as determined by the length of the tufting devices.

It will be noted that the tufting head does not itself engage the surface of the mattress but that it presses the apertured member into contact with the surface. Thus the area of contact is much larger than the area of the head, reducing any tendency of the tuft to pull through the ticking. Since the area of contact is not determined by the size of the head on the flexible element, the size of this head can be chosen to facilitate drawing it through the mattress by the tufting needle.

What I claim is:

1. A tufting device comprising a strand of material defining a loop, an elongated head having an apertured portion tiltably and slidably mounted on said loop in combination with an apertured member having recessed portions extending transversely of said member, said elongated head being seated on said apertured member and in the recessed portions thereof.

2. A fastening device comprising a strand of material defining a loop construction, a head having an apertured portion slidably and tiltably mounted on said loop construction, in combination with a member having an apertured portion and a recessed portion in direct communication with said apertured portion, said head seated on said member and located in said apertured and recessed portions thereof.

3. A tufting device comprising a strand of material defining a loop construction, a head having a depending portion containing a strand receiving opening, said head being tiltably mounted on said loop construction, in combination with an apertured member having a recessed portion, said apertured member and the recessed portions thereof defining portions, complemental to portions of said head, said head seated in said apertured member and the recess thereof.

4. A tufting device comprising a strand of material defining a loop construction, a head including a portion having an opening therein, said strand being mounted in said opening, in combination with an apertured member having wall portions defining a recess, the wall portions defining said recess being complemental to portions of said head and frictionally retaining said head in said apertured member.

5. A tufting device comprising a strand of material, an elongated head having a centrally located depending portion on one side thereof, said depending portion having an opening therethrough and said strand extending through said opening, in combination with a member having an aperture and recesses extending outwardly of said aperture, the portions of said member defining said aperture and recesses being complemental to portions of said head, said member maintaining said head frictionally seated therein.

6. A tufting device comprising a strand of material, an elongated head having longitudinal arcuate side wall portions and a portion containing an opening engaging and maintaining a portion of said strand therein, in combination with an apertured member having arcuate wall portions complemental to the arcuate side wall portion of said head, said strand extending through said apertured member and said elongated head being seated in said member and frictionally engaging the arcuate wall portions of said member.

WILLIAM COSTELLO MONAHAN.